United States Patent [19]

Weil

[11] Patent Number: 4,986,033
[45] Date of Patent: Jan. 22, 1991

[54] GASKETS AND GASKET-LIKE DEVICES WITH FASTENERS

[75] Inventor: Thomas L. Weil, Elverson, Pa.

[73] Assignee: Davlyn Manufacturing Co., Inc., Spring City, Pa.

[21] Appl. No.: 109,809

[22] Filed: Oct. 16, 1987

[51] Int. Cl.$^5$ .............................................. E06B 7/16
[52] U.S. Cl. ...................................... 49/492; 49/498; 277/166; 277/181; 87/9; 87/6
[58] Field of Search ................ 49/492, 498, 485, 493; 24/297, 295; 277/230, 229, 228, 181, 166, 186, 189; 126/190; 87/8, 6, 9, 12, 13

[56] References Cited

U.S. PATENT DOCUMENTS

| | | | |
|---|---|---|---|
| 2,121,893 | 6/1938 | Tex | 49/498 |
| 2,287,606 | 6/1942 | Eady. | |
| 2,638,642 | 5/1953 | Spraragen | 49/492 |
| 2,665,458 | 1/1954 | Wilcox | 49/491 |
| 2,719,343 | 10/1955 | Harris. | |
| 2,919,478 | 1/1963 | Sehn et al.. | |
| 2,938,249 | 5/1960 | Milne. | |
| 3,020,185 | 2/1962 | Moffitt | 277/181 |
| 3,167,824 | 2/1965 | Berwanger. | |
| 3,235,919 | 2/1966 | Tomashot. | |
| 3,578,764 | 5/1971 | Nunnally et al.. | |
| 3,737,972 | 6/1973 | Smoot. | |
| 4,822,060 | 4/1989 | Moyer et al. | 49/292 |

Primary Examiner—Kenneth J. Dorner
Assistant Examiner—Gerald A. Anderson
Attorney, Agent, or Firm—Panitch, Schwarze Jacobs & Nadel

[57] ABSTRACT

A gasket-like device includes an elongated core, an outer jacket woven and preferably braided around and along the core and a plurality of individual fasteners spaced along the device, each fastener including a base captured between the core and the outer jacket and an engagement portion extending outwardly from the base through the outer jacket. An outer covering of plastic or other material may be applied, if desired, around and along part or all of the outer jacket.

6 Claims, 1 Drawing Sheet

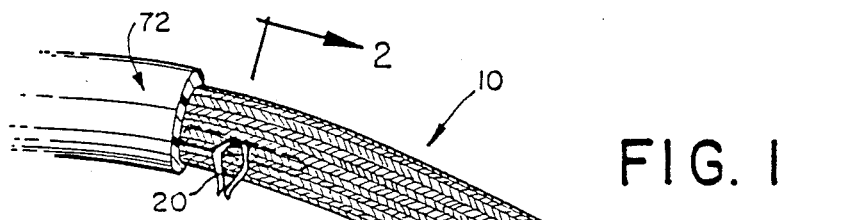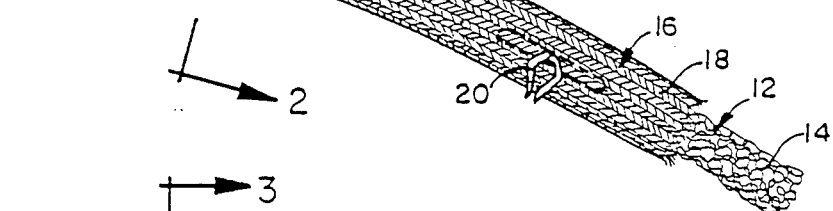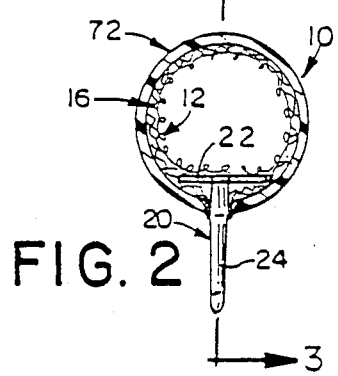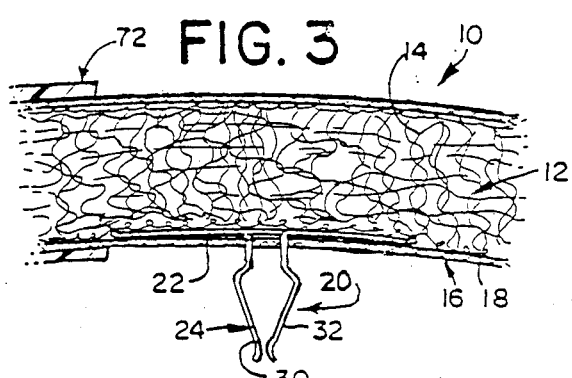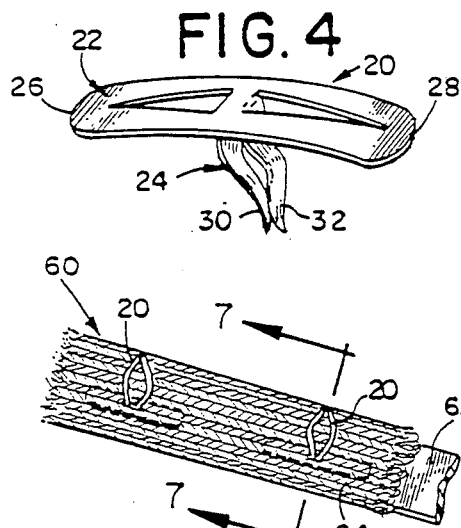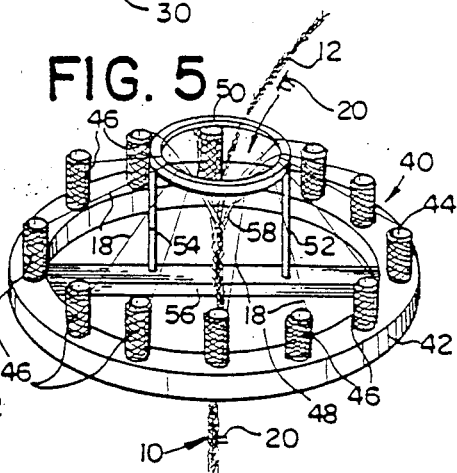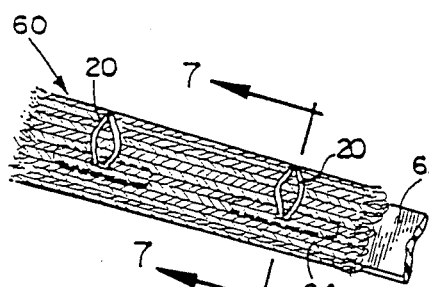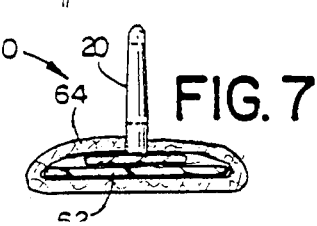

GASKETS AND GASKET-LIKE DEVICES WITH FASTENERS

FIELD OF THE INVENTION

The invention relates to gaskets and gasket-like devices such as weatherstrips, molding and the like and, in particular, to such devices having integral fasteners for attaching the device to a support.

BACKGROUND OF THE INVENTION

The doors of many appliances such as refrigerators, ranges, microwave ovens, etc. typically have a flexible, tubular gasket around their perimeter for sealing and a variety of other reasons. Previously, such doors have been fabricated by joining together front and back pieces. This has enabled the door manufacturers to use gasket assemblies which include a pair of joined, parallel, elongated cylindrical members. One member was then either pushed through a slot or slots provided on the "back" piece of the door or wound around the perimeter of such a back piece which was then fitted into a receiving cavity in the "front" piece of the door. An exposed cylindrical member formed the gasket while a remaining cylindrical member, hidden within the door, held the gasket cylindrical member in place against the door.

The cylindrical members of these gasket assemblies often were formed from a knitted, metal wire tubular cores covered with braided, glass fiber jackets.

There has been a desire on the part of appliance manufacturers to develop a one-piece door construction in such appliances to reduce fabrication costs. Gaskets would have to be attached to such doors from an exterior side using some type of mechanical fastening.

One approach for mechanically mounting such gaskets to one-piece doors has been to provide a flexible, hollow cylindrical gasket with clip-type fasteners protruding along one side thereof. Such gaskets have been formed from a hollow, tubular, knitted wire core and braided, glass fiber outer jacket, somewhat similar to the cylindrical members of the old gasket assemblies. After fabrication, a wire member, bent at several locations along its length to form a series of connected clip members, is inserted into the hollow center of the tubular wire core and the bent portions of the wire pressed through the wire core and surrounding fabric jacket by hand.

There are several drawbacks to such gaskets. First, they require considerable hand labor to assemble. Second, the wire has to be passed through the inner core and outer jacket without damage to either. As a result, the wire used must be fairly thin and the clip portions tend to be easily damaged. Third, because the wire must be inserted into the gasket after the gasket has been made, assembly becomes more cumbersome and difficult as gasket lengths are increased. The fabrication of significant continuous lengths of undamaged, unflawed gasket with the wastage which would be involved would be prohibitively expensive.

In addition to the foregoing limitations, the thin wire which must be used to enable the clip portions to be pressed through such gaskets does not provide a significant spring force for firmly attaching the gasket to the door or other mounting member. Because the thin wire is extremely flexible and does not trap any significant area of the gasket between itself and the door or other mounting member, it does little to prevent the gasket from rolling to either side of the attachment points or bending between the attachment points.

It would be beneficial to provide flexible gaskets with protruding fasteners for mounting to appliance doors and other members which can be attached to the doors or other members as firmly as desired.

It further would be beneficial to provide flexible gaskets with protruding fasteners in which the gaskets do not tend to roll around such fasteners.

It further would be beneficial to provide hollow, tubular gaskets with the aforesaid characteristics for light weight and durability.

It further would be beneficial to provide gaskets and other gasket-like devices with the foregoing characteristics in a form which further includes a plastic and/or rubber outer covering along at least some portion of the device.

It further would be beneficial to provide continuous, elongated gaskets, and gasket-like devices such as molding, etc., with embedded, protruding fasteners which exhibit superior mounting stability.

SUMMARY OF THE INVENTION

The aforesaid beneficial results and others are achieved by my invention.

In one aspect, the invention is an elongated, gasket-like device comprising an elongated core; a woven outer jacket surrounding the core and extending along the core; and a plurality of fasteners spaced along the device, each fastener having a base captured between the core and the woven outer jacket and each fastener further having an engagement portion extending outwardly from the base through the outer jacket.

In another aspect, the invention is the method of making an elongated gasket-like device with at least a plurality of spaced fasteners, each fastener including a base and an engagement portion extending from the base, which comprises the steps of weaving an outer jacket around an elongated core member and capturing the base of each of the plurality of fasteners along the device between the core and the outer jacket being woven with the engagement portion of each fastener protruding outwardly through the woven outer jacket.

BRIEF DESCRIPTION OF THE DRAWINGS

The foregoing summary, as well as the following detailed description of preferred embodiments of the invention will be better understood when read in conjunction with the appended drawings. For the purpose of illustrating the invention, there is shown in the drawings embodiments which are presently preferred. However, it should be understood that the invention is not limited to the precise arrangements and instrumentalities shown. In the drawings:

FIG. 1 is a perspective, diagrammatic, partially-sectioned view of a preferred embodiment of a gasket-like device of the invention;

FIG. 2 is a diagrammatic, transverse, local cross-sectional view of the device of FIG. 1 along the lines 2—2;

FIG. 3 is a diagrammatic, longitudinal, local cross-sectional view of the device of FIGS. 1 and 2 along the lines 3—3;

FIG. 4 is a diagrammatic, perspective view of a preferred clip;

FIG. 5 is a diagrammatic view of a braiding machine configured to fabricate the devices of the subject invention in the preferred mode;

FIG. 6 is a diagrammatic, perspective, partially-sectioned view of a generally planar embodiment of the invention; and FIG. 7 is a transverse, cross-sectional view of the embodiment of FIG. 6 along the lines 7—7.

DETAILED DESCRIPTION OF THE PREFERRED EMBODIMENTS

Referring to the drawings, wherein like numerals are employed for the indication of like elements throughout, there is shown in FIGS. 1-3, a first preferred embodiment gasket-like device 10 of the invention. Referring to FIG. 1, the basic, essential components of the device 10 include an elongated core 12, a surrounding woven outer jacket 16 and a plurality of individual fasteners 20. The core 12 is preferably a continuous, flexible, cylindrically-shaped, tubular member preferably knitted from a plurality of stainless steel wires 14 in a conventional fashion. The core 12 is shown in FIG. 1 as extending from one end of the device 10 for clarity. A woven outer jacket 16 surrounds and extends along the core 12. Preferably the jacket 16 is braided from a multiplicity of glass fiber yarns 18. Spaced at predetermined intervals along the device 10 are a plurality of individual preferred spring clip-type fasteners 20.

One such clip 20 is shown separately in FIG. 4. As can be seen in that figure, the clip includes a base 22 and an engagement portion 24 integral with the base 22 and extending substantially perpendicularly from one side thereof. The base 22 is substantially elongated between a pair of opposing ends 26 and 28 each of which is substantially rounded primarily to prevent cutting of the outer jacket 16. The engagement portion 24 of each clip includes a pair of adjoining, resiliently flexible spring arms 30 and 32 which can be compressed against one another to enable the arms to pass through an opening in the member to which the device 10 is attached and then return to their original, depicted configuration thereby securing the device to the member by an interference fit. As is best seen in FIG. 2, the base 22 of each clip 20 is captured between the core 12 and the outer jacket 16 with the engagement portion 24 extending outwardly from the base 22 through the outer jacket 16.

The basic device 10 formed by the core 12, woven outer jacket 16 and clip-type fasteners 20 can be used as a gasket in a conventional oven door.

The subject invention enjoys several advantages over the existing art. First, the engagement arms 30 and 32 of the clips 20 do not have to be of the same diameter or width as the base. Indeed, as is shown with respect to the clip 20 of FIG. 4, the engagement arms 30 and 32 are cut from the central portion of the base 22 which is much larger than either of the arms 30 and 32. The enlarged base allows a greater area of the outer jacket 16 to be trapped between the base 22 of the clip 20 and the member receiving the engagement portion 24 of the clip 20. This reduces the tendency of the device 10 to roll around the engagement point and results in a more securely fastened device 10.

The depicted clips 20 may be formed by stamping from a planar sheet of metal. However, other type clips and other fasteners of a wide variety of constructions and materials including plastic, composite plastic and metal, etc. can be used if suitable for the use to which the device is made. Moreover, since a variety of clips or other types of fasteners can be employed, the configuration of the engagement portion 24 and base 22 can be varied and the engagement force developed by the engagement portion 24 selected from a potentially wide range of attachment forces which can be achieved. The base 22 might be slightly longitudinally cambered as indicated to maintain the engagement portion 24 under tension when installed, thereby preventing movement between the clip 20 and the member receiving the clip. The base also can be cambered transversely or otherwise shaped in any desired way to optimize seating of the fastener against the receiving door or other member.

Fabrication of the device 10 is straightforward. The preferred, knitted wire core 12 is conventional, and its manufacture is known to those of ordinary skill in this art. Also, it is described at least to some extent in U.S. Pat. No. 3,578,764 incorporated herein by reference in its entirety. That patent discloses the beneficial uses of including a heat-resistant, flexible knitted metal wire core and a flexible, heat-resistant fabric jacket or cover, preferably of glass fibers, for use as an oven door gasket. Conventional elongated, tubular knitted wire members can be obtained from such distributors as Montgomery Co., Windsor Locks, Conn. and ACS Industries, Woonsocket, R.I. A flexible knitted wire core 12 for an oven door gasket might be made of 7 mil, full hard 304 stainless steel wire in a continuous jersey knit having 12 wales and $13 \pm 1$ courses/inch to form a continuous knit, cylindrically-shaped, hollow tube approximately $\frac{1}{2}$ inch in diameter. The specification for a wire knitting machine to knit a hollow wire core like the core 12 would be $\frac{3}{8}$ inch cylinder, 12 needles, 18 gauge, circular jersey knitting machine.

The method of providing the braided outer jacket 16 capturing the base 22 of the clip fasteners 20 against the core 12 is also straightforward. FIG. 5 depicts diagrammatically significant portions of a conventional braiding machine 40 which includes a base 42 mounting a multiplicity of spindles 44. Each spindle 44 receives a separate bobbin 46 of yarn 18. Only a few of the spindles 44 and bobbins 46 are depicted for clarity. The spindles 44 and bobbins 46 are driven along tracks (not depicted) in the base 42 in a weaving, maypole fashion so as to braid a continuous tubular outer jacket 16 around the core 12.

Such braiding machines can be obtained from a variety of commercial sources including Wardwell Braiding Machine Company, Central Falls, R.I. and Braider Manufacturing Company-Kokubun, Inc., Nakajimacho, Hamamatsu, Japan. The typical specification for such a machine is a 72 carrier braider, No. 2 butt, $36 \times 100$ gear ratio with 24 inch capstan. The typical specification for such a braided jacket might be, for example, 72 ends of yarn (fiberglass) size-150's, 10 count, $20 \pm 1$ picks per inch.

The core 12 of the device 10 is fed through the center opening 48 in the base 42. The machine 40 thereupon braids the yarns 18 into the outer jacket 16 extending around and along the length of the core 12. Normally in such machines, the core 12 would be fed upward and the fasteners inserted upwardly between the ascending core 12 and a cone formed by the multiplicity of yarns 18 being laid over that core 12 until some portion of the base 22 of the clip fastener 20 is captured by the yarns 18 and held against the core 12.

To assist in positioning the clips 20 or other fasteners, the braider 40 may be modified in a known matter depicted diagrammatically in FIG. 5 to add a central reversing ring 50 which enables the core 12 to be fed vertically downward, rather than upward, through the machine 40. The ring 50 is supported by a pair of arms 52 and 54 attached to a cross piece 56 fixedly supported in the central opening 48 of the base 42. In this way, a funnel 58 formed by the yarns 18 converging on the core 12 tapers downwardly onto the core 12, permitting the clips 20 or other individual fasteners to be inserted downwardly among the converging yarns 18 from above, as depicted. This simplifies, to some extent, the feeding and positioning of the individual fasteners.

After braiding, the glass fiber outer jacket 16 of the device 10 can be heat treated and/or colored, if desired, in a conventional fashion.

FIGS. 6 and 7 depict another preferred embodiment of the invention in the form of a generally flat, elongated, continuous, gasket-like device 60 with a multiplicity of clip fasteners 20 protruding from one side thereof. The device 60 includes in addition to the clips 20, a substantially planar, elongated core 62 and a surrounding planar woven outer jacket 64. The jacket 64 can be braided using a conventional braiding machine, like those previously identified, with salvage bars as are conventionally used on such machines to provide a substantially planar braided jacket 64 around the planar core 62. The planar core 62 could be formed by flattening a tubular knitted wire core like core 12 of the device 10. Other flexible, planar elongated members of fabric, plastic, metal or the like alternatively could be used.

Referring back to FIGS. 1-3, the basic device 10 already described can include, in addition to the core 12, surrounding outer jacket 16 and fasteners 20, at least one outer covering 72 over some or all of the outer jacket 16. This covering 72 is sectioned back in FIGS. 1-3 to reveal the outer jacket 16 and core 12 of the basic device.

As indicated, the preferred outer covering 72 is a layer formed from any of a variety of plastic compositions, applied in conventional ways to the outer jacket 16 of the device 10. In particular, an outer covering layer 72 of an elastomer such as silicone rubber can be applied to the outer jacket 16 by such conventional methods as low-pressure extrusion or dipping to provide a flexible, gasket-like device which provides air and/or weather tightness and would be ideally suited for use with appliances such as dryers Also, conductive polymers such as silver filled silicone might be employed as the outer covering layer 72 for using such devices to provide RF shielding and/or EMI shielding. Silicone rubber in particular is a preferred material for use as an outer covering due to its relatively high temperature performance, water resistance and long service life.

The outer layer 72 is depicted as circumferentially surrounding and extending along the outer jacket 16 of the device 10. However, it is understood that in certain applications, it may be advantageous to cover the outer jacket 16 with a covering which extends only partially around the circumference of the outer jacket 16 such as, for example, in the fabrication of a molding strip having a plastic finished side. In such cases other fasteners (not depicted) may be inserted, if desired, between the core and outer jacket, for example, on a side of the device 10 opposite the indicated fasteners 20, to partially protrude through the jacket and provide attachment points for the plastic outer layer. Also, in certain applications, the outer covering layer 72 may be extended only along a portion of the length of the device 10 or be repeated at intervals along the continuous length of the device 10.

The use of the disclosed devices 10 and 60 would be in a conventional fashion by inserting the clips 20 or other provided fasteners into holes, mating members or other suitable receptacle in a door or other receiving structure.

The devices of the subject invention enjoy considerable advantages over existing gaskets and gasket-like devices formed by the insertion of a bent, continuous wire through the various layers forming the device to provide fasteners. In particular, the devices of the subject invention can be made using solid as well as hollow cores, as is illustrated by the embodiment of FIGS. 6 and 7. Devices of the subject invention are not as likely to be damaged during fabrication, such as by deforming of the engagement clips or tearing of the core or outer jacket. Within reasonable limits, any desired attachment force can be provided by the selected use of clips of different sizes, materials, configurations, etc. and possibly other types of fasteners. Greater attachment forces can easily be achieved because larger clips, for example, can be employed. Moreover, different clips and fasteners can be used along the same device to provide greater versatility in attachment. There is less tendency of the device to move after attachment as it can be firmly secured between the base of each of the fasteners and the door or other structure receiving the fastener. Moreover, the base can be configured to some degree, if desired, to conform to the surface of the door or other receiving structure.

It will be appreciated that devices of the subject invention can be provided in a wide variety of sizes. While knitted wire is preferred as the core material for strength, flexibility, light weight and temperature resistance, other types of hollow and solid cores and core materials can be used. While glass fiber yarn wearable is the element material preferred for the outer jackets 16 and 64 for the same reasons, natural and polymeric materials could be used. Indeed, it is conceivable that even metal wire might be desired as the outer jacket weavable element material in some applications. In addition to the described silicone materials, other materials including but not limited to room temperature vulcanizing rubbers and conventional polymeric materials might be applied around and/or along part or all of the outer jackets 16 or 64 of the devices of the invention by conventional means including, in addition to those already mentioned, injection molding. Such polymeric materials also might be hard curing rather than elastomeric. Also, true rubbers and other types of coverings may be employed over the outer jacket.

While various embodiments of the invention have been disclosed, and modifications thereto suggested, it will be recognized by those skilled in the art that changes could be made to the above-described embodiments without departing from the broad, inventive concept thereof. It is understood, therefore, that this invention is not limited to the particular embodiments disclosed, but is intended to cover any modifications which are within the scope and spirit of the invention, as defined by the appended claims.

I claim:

1. A method of making an elongated gasket-like device with at least a plurality of spaced fasteners, each fastener including a base and an engagement portion extending transversely from the base, comprising the steps of:
   weaving an outer jacket of weavable elements around an elongated core; and
   inserting separate, unconnected, individual fasteners between the core and the weavable elements being woven around the core with the engagement portion of each fastener facing away from the core and towards the weavable elements, the weavable elements capturing the base of each inserted fastener against the core between adjoining portions of the core and the outer jacket being woven wherein each fastener base is irremovably retained between the adjoining portions of the core and outer jacket with the engagement portion of each fastener protruding outwardly through the woven elements of the adjoining portion of the outer jacket.

2. The method of claim 1 wherein the weaving step comprises braiding the outer jacket around and along the core.

3. The method of claim 1 wherein said elongated core comprises a hollow tube of knitted metal wire 4. The method of claim 1 wherein the outer jacket comprises a braided sleeve of glass fiber yarns.

5. The method of claim 1 further comprising the step of providing an outer covering on at least a portion of the outer jacket.

6. The method of claim 5 wherein the outer covering comprises a silicone layer.

* * * * *